Patented Jan. 16, 1945

2,367,251

UNITED STATES PATENT OFFICE 2,367,251

PROCESS FOR THE PRODUCTION OF DI-ACETONE KETO GULONIC ACID

John Weijlard, Westfield, and John B. Ziegler, Jr., Rahway, N. J., assignors to Merck & Co., Inc., Rahway, N. J., a corporation of New Jersey No Drawing Application June 12, 1942, Serial No. 446,821

8 Claims. (Cl. 260—338)

This invention relates to processes for the oxidation of diacetone sorbose.

One object of our invention comprises, inter alia, a new and improved method for the oxidation of diacetone l-sorbose to diacetone keto gulonic acid, a valuable intermediary in the synthesis of l-ascorbic acid, commonly known as Vitamin C.

In accordance with our invention an aqueous solution of diacetone l-sorbose is heated with a suitable hypohalogenite.

The hypohalogenite in accordance with the invention is preferably a suitable hypochlorite or a suitable hypobromite. We prefer alkali hypochlorites or hypobromites. Thus, for example, satisfactory results are obtained with sodium or potassium hypochlorite or sodium or potassium hypobromite. Such hypohalogenites may be obtained by dissolving the selected halogen in a solution of the hydroxide of the metal of which the hypohalogenite is desired.

The oxidation reaction in accordance with our invention is preferably carried out in an alkaline solution advantageously procured by using an alkaline hypohalogenite solution. For this reason, when preparing the desired hypohalogenite solution to be used in our process we prefer to use an amount of hydroxide which is in excess of that required for the hypohalogenite formation calculated on the amount of halogen to be introduced. For best results, the reaction temperature throughout the oxidation reaction should be maintained above 45°. We prefer, however, to maintain such temperature substantially within a range of from 50° to 60° C. The heating is continued until the oxidation reaction is substantially complete which fact is evidenced by the cessation of the consumption of further amounts of available halogen. The period required for completion of the oxidation reaction may vary depending upon the particular hypohalogenite used. In some cases, particularly when using sodium hypochlorite, prolonged heating must be resorted to for the purpose of accomplishing the desired result.

Within the preferred scope of our invention and as a further embodiment thereof, we have discovered that superior results especially with respect to yields and reaction times, are obtained when conducting the heating in accordance with the invention, in the presence of a suitable catalyst. Catalysts that have been found useful for this purpose are, for instance, the oxides or hydroxides of cobalt, nickel, palladium and uranium. Of these, the oxides of cobalt and nickel are preferred.

The catalyst within the preferred procedure of our invention may be added either as such or may be produced in situ. We prefer the latter practice adding the catalyst in the form of an aqueous solution of a suitable salt to the alkaline reaction medium either before or after the addition of the diacetone sorbose. In such case, the metal oxide or hydroxide constituting the desired catalyst is produced in finely dispersed form.

The following examples illustrate methods of carrying out the present invention, but it is to be understood that these examples are given by way of illustration and not of limitation.

Example I

A solution of potassium hypobromite is prepared by dissolving 16 parts by weight of bromine in a solution of 17.5 parts by weight of potassium hydroxide in 150 parts by volume of water. A solution of 10 parts by weight of diacetone sorbose in 50 parts by volume of water is added. The mixture is held at 50° to 55° C. until the available bromine remains constant, which is accomplished after approximately three hours. The cooled solution is then neutralized with carbon dioxide and concentrated in vacuo. The diacetone keto gulonic acid formed in the reaction may be isolated from the concentrate in any known manner, such as crystallization, and filtering.

The following Example II illustrates a procedure in accordance with the invention using a catalyst.

Example II

A solution of sodium hypochlorite is prepared by dissolving 56 parts by weight of chlorine in a solution of 80 parts by weight of sodium hydroxide in 750 parts by volume of water. A solution of 50 parts by weight of diacetone sorbose in 250 parts by volume of water is then added. To this mixture is added a solution of 2 parts by weight of $NiCl_2.6H_2O$ in 10 parts by weight of water and the whole held at a temperature maintained between 50° and 60° C. until the completion of the reaction, i. e., until all available chlorine has been consumed which is accomplished after approximately 20 minutes. The catalyst is then removed by filtration and the solution worked up substantially as described hereinabove in connection with Example I.

Instead of using any of the procedures outlined in Examples I and II for the recovery of the diacetone keto gulonic acid, we find it of advantage to use the procedure hereinafter exemplified in Example III.

*Example III*

The solution obtained in accordance with Examples I and II supra, after the completion of the hypohalogenite reaction, and in the case of Example II, after removal of the catalyst, is first neutralized to a pH of about 9 using a strong acid such as hydrochloric acid as the neutralizing acid. The solution is then concentrated in vacuo to about 350 parts by volume. This concentrate is then neutralized with hydrochloric acid to a pH of about 7, and thereafter cooled to approximately 10° C. Upon addition of approximately 25 parts by volume of ice-cold concentrated hydrochloric acid, the diacetone keto gulonic acid is precipitated and thereafter filtered off and washed, preferably with ice water.

Instead of adding a nickel salt to the reaction mixture, as illustrated in Example II, suitable salts of any of the metals hereinabove mentioned may be added for the purpose of conveniently producing the particular catalyst desired. Such suitable metal salts in this connection are, for instance, palladium chloride, uranium nitrate, or cobalt sulphate. It is understood that these enumerated salts are furnished by way of illustration and that any other suitable salts may be substituted. The metal oxide or hydroxide catalyst in accordance with our invention may be added if desired as hereinabove pointed out as such to the reaction mixture. It is also possible and sometimes of advantage to use the catalytic oxide or hydroxide suitably carried or adsorbed on a carrier material.

Modifications may be made in carrying out the present invention, without departing from the spirit and scope thereof, and we are to be limited only by the appended claims.

We claim:

1. In a process for the production of diacetone keto gulonic acid, the step comprising heating diacetone sorbose with an alkali metal hypohalogenite while maintaining an alkaline pH, and, in the presence of a catalyst selected from the group consisting of the oxides and hydroxides of nickel, cobalt, uranium, and palladium.

2. In a process for the production of diacetone keto gulonic acid, the step comprising heating diacetone sorbose with an alkali metal hypochlorite, while maintaining an alkaline pH, and in the presence of nickel hydroxide.

3. In a process for the production of diacetone keto gulonic acid, the step comprising heating diacetone sorbose with an alkali metal hypochlorite, while maintaining an alkaline pH, and in the presence of cobalt hydroxide.

4. In a process for the production of diacetone keto gulonic acid, the step comprising heating diacetone sorbose with sodium hypochlorite, while maintaining an alkaline pH, and in the presence of nickel hydroxide.

5. In a process for the production of diacetone keto gulonic acid, the step comprising heating diacetone sorbose with sodium hypochlorite, while maintaining an alkaline pH, and in the presence of cobalt hydroxide.

6. Process for the production of diacetone keto gulonic acid comprising heating diacetone sorbose with a metal hypohalogenite, while maintaining an alkaline pH, in the presence of a catalyst selected from the group consisting of the oxides and hydroxides of nickel, cobalt, uranium, and palladium, removing said catalyst, adjusting the pH of the resulting solution to about 9, concentrating the adjusted solution in vacuo, adjusting the pH of the concentrate to about 7 and adding to the adjusted concentrate, while at a temperature below normal, chilled concentrated strong acid to thereby precipitate diacetone keto gulonic acid.

7. Process for the production of diacetone keto gulonic acid comprising heating diacetone sorbose with a sodium hypochlorite, in the presence of nickel hydroxide, removing the hydroxide, adjusting the pH of the resulting solution to about 9, concentrating the adjusted solution in vacuo, adjusting the pH of the concentrate to about 7, and adding to the adjusted concentrate, while at a temperature below normal, chilled concentrated hydrochloric acid, to thereby precipitate diacetone keto gulonic acid.

8. In a process for the production of diacetone keto gulonic acid, the step comprising heating diacetone sorbose with a metal hypohalogenite while maintaining an alkaline pH, and, in the presence of a catalyst selected from the group consisting of the oxides and hydroxides of nickel, cobalt, uranium, and palladium.

JOHN WEIJLARD.
JOHN B. ZIEGLER, Jr.